May 17, 1960     W. B. WILLIAMS     2,936,888
PRODUCTION OF CLARIFIED ACIDIC PHOSPHATIC SOLUTIONS
Filed July 7, 1958
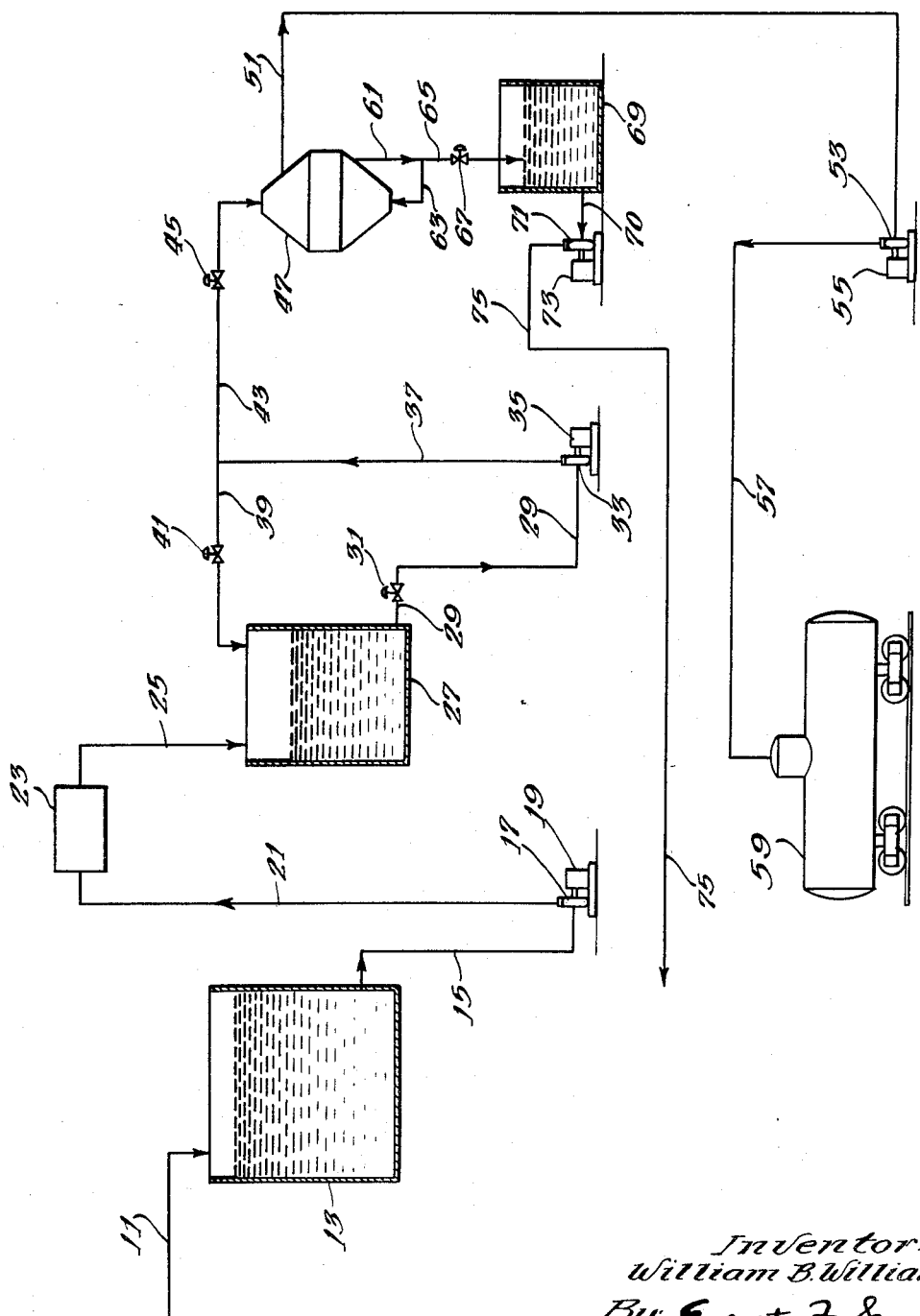
Inventor:
William B. Williams
By: Everet F. Smith
Attorney United States Patent Office 2,936,888
Patented May 17, 1960

2,936,888

PRODUCTION OF CLARIFIED ACIDIC PHOSPHATIC SOLUTIONS

William B. Williams, Lakeland, Fla., assignor to International Minerals & Chemical Corporation, a corporation of New York Application July 7, 1958, Serial No. 746,758

12 Claims. (Cl. 210—71)

This invention generally relates to a process for the production of clarified acidic phosphatic solutions. More particularly, the invention relates to a process for the efficient separation of suspended solid impurities from solutions of inorganic acidic phosphatic materials such as those formed by the aqueous leaching of acidulated phosphate rock.

In conventional methods for the production of aqueous solutions of inorganic acidic phosphatic materials, phosphate rock is reacted with sulfuric acid and the reaction product is water leached to yield a crude aqueous solution product in which is suspended a substantial quantity of solid impurities. This crude aqueous product is the so-called wet process phosphoric acid of commerce.

The problems occasioned by suspended solid impurities are particularly acute with respect to concentrated wet process phosphoric acid. Conventional practice in the preparation of phosphoric acid yields a crude wet process phosphoric acid containing about 15% to about 35% by weight of phosphorus pentoxide ($P_2O_5$) and a substantial portion of suspended solid impurities which do not readily settle. Such crude dilute wet process acid is normally concentrated to increase the $P_2O_5$ content to at least about 45% by weight and more frequently to at least 50% by weight. The resultant concentrated acid is normally dark in color. Submerged combustion burners are usually utilized, because of their economic advantages, to concentrate the acid. Such a concentration procedure necessarily also serves to proportionately increase the quantity of suspended solid impurities in the acid and yields concentrated acid solutions frequently containing about 15% to about 30% by weight of suspended solids, which are particularly difficult to remove from the solution.

In general, it has been determined that the impurities present in wet process acidic phosphatic solutions, such as wet process phosphoric acid, comprise calcium sulfate hemihydrate ($CaSO_4 \cdot \tfrac{1}{2} H_2O$), calcium sulfate anhydrite ($CaSO_4$), sodium and potassium silicofluoride, iron and aluminum phosphates; and in acidic solutions resulting from concentration or other procedures in which organic materials are introduced in small amounts, double salts of iron and aluminum phosphates with phosphoric acids bearing organic constituents. These constituents may theoretically be represented by the formula $RPO_4 \cdot 2H_3PO_4$, where "R" is an organic radical derived from the organic material employed in the production of the particular phosphatic solution treated. There may also be varying amounts of other organic matter present. These various impurities are desirably substantially removed in order to have an acidic phosphatic solution which is saleable in competition with "furnace phosphoric acid" for the manufacture of fertilizers and animal feed grade products.

Upon standing in storage or during shipment in tank cars or the like, such acidic phosphatic solutions deposit a layer of solid material, an effect which renders handling of the stored or shipped acid exceedingly difficult and frequently economically infeasible. Some solids and color may be removed from the crude solution by filtration. However, the concentrated acid is very viscous and difficult to filter and, further, the solids are of such a nature that they readily plug the filter. Moreover, the solids are very difficult to remove from the filter. Also, even when the acid is filtered, upon further standing solids form in the solution and settle out. The solids which subsequently form in the solution and settle out of the solution are usually denominated post-precipitated solids, and the mechanism is termed post-precipitation.

The removal of suspended solid impurities from wet process phosphatic solutions as contemplated by this invention differs fundamentally from the defluorination of similar phosphatic solutions. The present invention, which only incidentally reduces the fluorine content of the acidic phosphatic solution treated, is applicable to remove suspended solids from defluorinated or undefluorinated aqueous solutions of inorganic phosphates.

It is accordingly an object of this invention to provide a method for efficiently producing a clarified acidic phosphatic solution.

It is another object of the invention to provide a method for efficiently removing suspended solid impurities from acidic inorganic phosphatic materials.

It is a further object of the invention to provide a wet process phosphoric acid sufficiently free of suspended solid impurities so that it may be shipped or stored over an extended time period without appreciable precipitation or sedimentation.

It is an additional object of the invention to provide an economical process for the clarification of concentrated wet process phosphoric acid.

It is a more specific object of the invention to provide an economical process for the clarification of concentrated wet process phosphoric acid which does not of necessity utilize clarification agents.

It is another specific object of the invention to provide a process for the continuous clarification of concentrated wet process phosphoric acid which is appropriate for installation in a conventional wet process phosphoric acid plant.

In accordance with the present invention, it has been discovered that an eminently satisfactory clarified acidic phosphatic solution can be achieved by means of a series of critical and interdependent process steps. The process of the invention does not require the use of clarification reagents and yet provides for removal of substantially all of the solids from the phosphatic solution.

Generally described, it has been discovered that solutions of acidic inorganic phosphates, containing suspended solid impurities, can efficiently be clarified by rapidly cooling such solutions and subjecting the cooled solution to centrifugal separation. The centrifugal separation produces a clarified fraction and a solids containing fraction, which are separately recovered.

It has been previously suggested to clarify wet process phosphoric acid by using specific clarification agents such as conventional commercial flocculating agents which are stable in concentrated mineral acids. These clarification agents increase the settling rate of solids suspended in the wet process phosphoric acid. The cost of the clarification reagent, however, adds to the cost of the process. Further, it is often desirable to produce a clarified solution without the use of clarification reagents. In the process of this invention a clarification agent is not necessary; however, when desired, a clarification agent may be utilized in the manner hereinafter set forth.

It has also been suggested that the clarified wet process phosphoric acid may be obtained by centrifuging a crude wet process phosphoric acid that has been held in a quiescent state for a sufficient amount of time to permit precipitation of substantially all of the solids from the supersaturated solution. Using such a process it was believed necessary to maintain the acid in a quiescent state for at least five days before performing the centrifugal separation of the supernatant liquid. Such a prolonged period of holding has the disadvantage of requiring a large holding tank.

It has now been discovered, and the process of this invention is based on this discovery, that a clarified acidic phosphatic solution may be obtained when a crude acidic phosphatic solution at an elevated temperature is rapidly cooled after which the rapidly cooled solution is subjected to a centrifugal separation operation. The cooling is preferably effected to rapidly lower the temperature of the acid at least 20° F. and more preferably at least 30° F.

The process of this invention may be effected in the clarification of acidic phosphatic solutions in all concentrations. Acid phosphate solutions formed by the leaching of phosphate rock may constitute substantially calcium-free phosphoric acid, or, depending upon the degree of acidulation, approach monocalcium phosphate solutions characterized by a $CaO/P_2O_5$ mole ratio of about 1:1. The invention is useful in the clarification of all such solutions and more specifically is applicable to acidic phosphatic solutions ranging from phosphorus acid to monocalcium phosphate. The problems which attend the clarification of acidic phosphatic solutions containing in excess of about 45% by weight of $P_2O_5$ are particularly acute, and the invention finds important utility in the efficient clarification of such materials.

In accordance with this invention the acidic phosphatic solution to be clarified is at an elevated temperature. The concentrated crude acidic phosphatic solution withdrawn from evaporators, especially evaporators of the submerged combustion type, is at an elevated temperature, and is particularly suitable as a feed material to the process. The phosphatic solution is generally removed from a submerged combustion evaporator at a temperature above about 150° F. and more usually within the range of from about 160° F. to about 280° F. The acidic phosphatic solution may also be from a vacuum or rdeuced pressure evaporator and is usually at a temperature above 120° F. and below 280° F.

In accordance with the process of this invention the crude acidic phosphatic solution is rapidly cooled at least 20° F. and more preferably at least 30° F. The acidic solution preferably is at a temperature above about 150° F. and is rapidly cooled to a temperature below about 120° F. The cooling should be effected in less than twenty-four hours and preferably in less than twelve hours and more preferably in less than six hours. It is specifically preferred that the cooling be effected in less than four hours, since it has been determined that a substantially clarified acidic solution, with little post-precipitation, is produced when such a rapid cooling is effected. It has also been determined that a rapid cooling breaks the supersaturation of materials which form the post-precipitated solids in the acidic phosphatic solution so that the solids may subsequently be removed in a centrifugal separation operation. As hereinbefore set forth, the cooling is preferably to a temperature below about 120° F. and the solution is more preferably cooled to a temperature below about 100° F.

The cooled acid phosphatic solution may be directly passed to a centrifugal separator; however, it is preferred to hold the cooled acid in storage for a period of from about 12 to about 36 hours. The conditions in storage may be such that the acidic solution is maintained in the quiescent state. However, it is not essential and, in some instances, in order to prevent the formation of a solid sludge layer on the bottom of the storage container, agitating conditions in the storage zone are maintained.

The cooled acidic phosphatic solution, with or without holding in storage, is then passed to a centrifugal separation operation. The centrifugal separation is preferably effected with a centrifugal clarifier which is a machine designed to subject a mass or stream of liquid to centrifugal force, thereby clearing it by separating the solid particles that were in the liquid. Centrifugal clarifiers of this type are well known and are commercially available. The centrifugal separation produces a clarified acidic phosphatic fraction and also produces a solids containing or sludge fraction which are separately recovered. One or both of these fractions may be further treated if desired.

As hereinbefore set forth, a clarification agent may be used in the present invention, when desired, although the use of clarification agents is not essential in the present invention. The clarification agent may be added at any suitable stage of the process before the centrifugal separation operation. The clarification agent may be added when the solution is at the elevated temperature, or may be added after the cooling step of the process. The clarification agent may be a conventional commercial flocculating agent, stable in concentrated mineral acids, and specifically stable in the acidic phosphatic solution being treated. Examples of such flocculating agents include water-soluble high molecular weight, synthetic polymers such as the polyacrylamides which are sold under the commercial trade name "Separan," guar, the hydrolyzed polyacrylonitrile resins or the salts thereof such as the sodium and potassium salts, and the like. Such commercial flocculating agents are employed in the conventional manner normally in water solution, in about 0.05 to about 2% by weight in an amount requisite to provide from about 0.05 to about 2 pounds thereof per ton of acidic phosphatic solution treated.

Having generally described the process of the invention, a more specific and detailed description will be given with reference to the accompanying drawing which is a schematic drawing illustrating the general application of the process of the invention. The drawing is intended merely as one illustration and not as a limitation of the instant invention. Modifications of the process illustrated in the drawing, while employing the principles of the instant invention, will be apparent to those skilled in the art.

Referring to the drawing, a crude concentrated acidic phosphatic solution from a submerged combustion evaporator of a plant producing commercial wet process phosphoric acid by water leaching sulfuric acid treated phosphate rock is passed through line 11 into a tank 13. The tank 13 is mainly used to act as a surge tank and to supply a reservoir for the acidic solution feed. The solution in the tank 13 in a commercial plant is usually within the temperature range from about 160° F. to about 280° F. The acidic solution at this elevated temperature is withdrawn through line 15 and is pumped through centrifugal pump 17, driven by a suitable motor 18, through line 21 into a cooler 23. In the cooler 23 the acidic solution is rapidly cooled to a temperature of about 85° F. The cooled acidic solution at a temperature of about 85° F. is withdrawn through line 25 and passed into tank 27.

As previously set forth in the discussion of the invention, the cooled acidic solution may be passed directly to the centrifugal separation zone; however, the cooled acid may be held in a storage zone when desired.

The acidic solution is maintained in tank 27 for a period of about twenty-four hours. It has been determined that non-quiescent or agitating conditions are preferably maintained in tank 27 and accordingly, to effect agitating conditions a recirculatory flow is maintained. Material is withdrawn through line 29, containing valve 31, and is pumped by a suitable pump 33 through line 37 and line 39 containing valve 41 back to the top of the tank 27. In this recirculating operation valve 45 in line 43 is maintained in a closed position. The pump 33 is driven by a suitable motor 35.

After holding the material in tank 27 for about twenty-four hours, valve 41 is closed and simultaneously valve 45 in line 43 is opened. The flow of material is then through line 29, pump 33, line 37 and line 43 into a centrifugal separator 47. The centrifugal separator 47 is preferably of the continuous type; however, a batch type of centrifugal separator or a battery of batch type or continuous centrifugal separators may be used. In the centrifugal separator, centrifugal and centripetal forces effect the separation of the solids in the cooled crude acidic phosphatic solution, thereby producing a clarified acidic phosphatic soluion which is removed through line 51, and a solids containing or sludge fraction which is removed through line 61. In a pilot plant operation a Merco C-9 continuous centrifuge was used. The feed rate to the centrifuge was 3.5 to 4.0 gallons per minute. The centrifuge was run at 8700 r.p.m.

The clarified acidic phosphatic solution in line 51 is picked up by centrifugal pump 53 driven by a suitable motor 55. The pump 53 discharges the clarified solution through a line 57 which delivers the clarified acidic phosphatic solution to a delivery point, such as to tank car 59.

A portion of the solids containing fraction in line 61 is recycled to the centrifugal separator 47. The remainder of the solids containing fraction in line 61 is withdrawn through line 65 containing valve 67 and is passed into a tank 69. A suction line 70 connects a lower section of the tank 69 with a centrifugal pump 71 which is driven by motor 73. The discharge line 75 delivers the solid containing fraction to a suitable delivery point. In a pilot plant operation the ratio of overflow from the centrifuge withdrawn through line 51 to the underflow withdrawn through line 65 was 4.0/1.0.

In order to give a clearer understanding of the invention, but with no intention to be limited thereto, the following specific example is given:

EXAMPLE

Two samples of crude wet process phosphoric acid obtained by water leaching sulfuric acid treated phosphate rock were treated in accordance with this invention. The two samples were withdrawn from the submerged combustion evaporators of a commercial wet process phosphoric acid plant. The acid samples were withdrawn at various temperatures as indicated in the table. Each of the samples was rapidly cooled in three hours and then held in storage for various periods of time. The results of these tests are indicated in the following table:

Table

| Sample 1 | | | Sample 2 | | |
| --- | --- | --- | --- | --- | --- |
| Temp. | Time Elapsed | Percent Solids Volume | Temp. | Time Elapsed | Percent Solids Volume |
| 178° F | | 16 | 170° F | | 16 |
| 85° F | 3 hours | 22 | 80° F | 3 hours | 22 |
| 80° F | 1 day | 22 | 80° F | 1 day | 22 |
| 80° F | 2 days | 22 | 80° F | 2 days | 22 |
| 80° F | 7 days | 22 | 80° F | 3 days | 22 |

These tests show that a rapid cooling to a temperature below 100° F. breaks the supersaturation of materials which form the post-precipitated solids in wet process acid.

A portion of Sample 1 material which was cooled within three hours and held in storage for 24 hours was centrifuged and produced a 54% $P_2O_5$ clarified acid having only 2% solids by volume. On standing for 8 days the clarified acidic solution produced an additional 2% of post-precipitated solids, thereby resulting in a total of 4% solids by volume in the clarified solution. The solids in the solution are sufficiently fine so as not to create any heavy sediment layer in a tank when the acid is subsequently held in storage.

The invention, as illustrated by the foregoing example, affords an efficient and economical method for the production of a clarified wet process acidic phosphate solution. The clarified product is of good quality and the sludge or solids containing fraction removed in the centrifugal separation finds utility in the fertilizer industry. The invention accordingly represents a significant contribution to the art.

The description of the invention utilized specific reference to certain process details; however, it will be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A process for producing a substantially clarified acidic inorganic phosphatic solution which comprises rapidly cooling an acidic inorganic phosphatic solution containing suspended solid impurities from a temperature above about 150° F. at least 20° F. in less than about 24 hours, subjecting the cooled solution to centrifugal separation to separate the solid impurities from the acidic inorganic phosphatic solution and recovering a substantially clarified acidic inorganic phosphatic solution.

2. A process for producing a substantially clarified acidic inorganic phosphatic solution which comprises rapidly cooling an acidic inorganic phosphatic solution containing suspended solid impurities from a temperature above about 150° F. at least 30° F. in less than about 24 hours, subjecting the cooled solution to centrifugal separation to separate the solid impurities from the acidic inorganic phosphate solution and recovering a substantially clarified acidic inorganic phosphatic solution.

3. A process for producing a substantially clarified acidic inorganic phosphatic solution which comprises cooling an acidic inorganic phosphatic solution containing suspended solid impurities from a temperature above about 150° F. to a temperature below about 100° F. in less than about 24 hours, subjecting the cooled solution to centrifugal separation to separate the solid impurities from the acidic inorganic phosphatic solution and recovering substantially clarified acidic inorganic phosphatic solution.

4. A process for producing a substantially clarified acidic inorganic phosphatic solution which comprises rapidly cooling an acidic inorganic phosphatic solution containing suspended solid impurities from a temperature within the range of from about 160° F. to about 180° F. to a temperature below about 100° F. in less than about 24 hours, subjecting the cooled solution to centrifugal separation to separate the solid impurities from the acidic inorganic phosphatic solution and separately recovering a substantially clarified acidic inorganic phosphatic solution.

5. A process for producing a substantially clarified acidic inorganic phosphatic solution which comprises cooling an acidic inorganic phosphatic solution containing suspended solid impurities from a temperature above about 150° F. to a temperature below about 120° F. in less than about 24 hours, subjecting the cooled solution to centrifugal separation to separate the solid impurities from the acidic inorganic phosphatic solution and recovering a substantially clarified acidic inorganic phosphatic solution.

6. A process for producing a substantially clarified acidic inorganic phosphatic solution which comprises cooling an acidic inorganic phosphatic solution containing suspended solid impurities from a temperature above about 150° F. to a temperature below about 120° F. in less than about 6 hours, subjecting the cooled solution to centrifugal separation to separate the solid impurities from the acidic inorganic phosphatic solution and recovering a substantially clarified acidic inorganic phosphatic solution.

7. A process for producing a substantially clarified acidic inorganic phosphatic solution which comprises cooling an acidic inorganic phosphatic solution containing suspended solid impurities from a temperature above about 150° F. to a temperature below about 120° F. in less than about 4 hours, subjecting the cooled solution to centrifugal separation to separate the solid impurities from the acidic inorganic phosphatic solution and recovering a substantially clarified acidic inorganic phosphatic solution.

8. A process for producing a substantially clarified concentrated wet process phosphoric acid solution which comprises rapidly cooling concentrated wet process phosphoric acid solution containing suspended solid impurities from a temperature above about 150° F. at least 30° F. in less than about 24 hours, holding the cooled acid for a period of from about 12 hours to about 36 hours and then subjecting the cooled solution to centrifugal separation to separate the solid impurities from the wet process phosphoric acid and separately recovering a substantially clarified concentrated wet process phosphoric acid solution.

9. A process for producing a substantially clarified concentrated wet process phosphoric acid solution which comprises rapidly cooling concentrated wet process phosphoric acid solution containing suspended solid impurities from a temperature above about 150° F. to a temperature below about 120° F. in less than about 24 hours, holding the cooled acid for a period of from about 12 hours to about 36 hours and then subjecting the cooled solution to centrifugal separation to separate the solid impurities from the wet prcoess phosphoric acid and separately recovering a substantially clarified concentrated wet process phosphoric acid solution.

10. A process for producing a substantially clarified concentrated wet process phosphoric acid solution which comprises rapidly cooling concentrated wet process phosphoric acid solution containing suspended solid impurities from a temperature above about 150° F. to a temperature below about 100° F., in less than about 24 hours, holding the cooled acid for a period of from about 12 hours to about 36 hours and then subjecting the cooled solution to centrifugal separation to separate the solid impurities from the wet process phosphoric acid and separately recovering a substantially clarified concentrated wet process phosphoric acid solution.

11. A process for producing a substantially clarified concentrated wet process phosphoric acid solution which comprises cooling concentrated wet process phosphoric acid solution containing suspended solid impurities and having a $P_2O_5$ content above about 45 weight percent from a temperature above about 150° F. to a temperature below about 120° F. in less than about 12 hours, holding the cooled acid for a period of from about 12 hours to about 36 hours and then subjecting the cooled solution to centrifugal separation to separate the solid impurities from the wet process phosphoric acid and recovering a substantially clarified concentrated wet process phosphoric acid having a $P_2O_5$ content above about 45 weight percent.

12. A process for producing a substantially clarified concentrated wet process phosphoric acid solution which comprises cooling concentrated wet process phosphoric acid solution containing suspended solid impurities and having a $P_2O_5$ content above about 45 weight percent from a temperature above about 150° F. to a temperature below about 100° F. in less than about 4 hours, holding the cooled acid for a period of from about 12 hours to about 36 hours and then subjecting the cooled solution to centrifugal separation to separate the solid impurities from the wet process phosphoric acid and recovering a substantially clarified concentrated wet process phosphoric acid having a $P_2O_5$ content above about 45 weight percent.

References Cited in the file of this patent

UNITED STATES PATENTS

| | | |
|---|---|---|
| 1,451,786 | Ross | Apr. 17, 1923 |
| 1,665,167 | Guma | Apr. 3, 1928 |
| 2,075,127 | Mead | Mar. 30, 1937 |
| 2,288,667 | Allen | July 7, 1942 |
| 2,338,408 | Coleman | Jan. 4, 1944 |
| 2,424,179 | McNitt | July 15, 1947 |
| 2,710,247 | Knowles | June 7, 1955 |
| 2,807,521 | Lambe | Sept. 24, 1957 |